United States Patent [19]
Chang

[11] Patent Number: 6,126,486
[45] Date of Patent: Oct. 3, 2000

[54] SMART CARD CONNECTOR HAVING CONTACT RETENTION MEANS

[75] Inventor: Yao-Hao Chang, Chung-Ho, Taiwan

[73] Assignee: Hon Hai Precision Ind. Co., Ltd., Taipei Hsien, Taiwan

[21] Appl. No.: 09/309,170

[22] Filed: May 10, 1999

[30] Foreign Application Priority Data

Jul. 7, 1998 [TW] Taiwan ................................ 87210872

[51] Int. Cl.⁷ .................................................. H01R 24/00
[52] U.S. Cl. ........................................... 439/630; 439/444
[58] Field of Search ..................................... 439/630, 444, 439/62, 260; 235/441

[56] References Cited

U.S. PATENT DOCUMENTS

| | | | |
|---|---|---|---|
| 5,334,827 | 8/1994 | Bleier et al. ............................. | 235/492 |
| 5,667,408 | 9/1997 | Broschard, III et al. ............... | 439/630 |
| 5,775,929 | 7/1998 | Hashiguchi ............................. | 439/260 |
| 5,997,345 | 12/1999 | Inadama .................................. | 439/489 |

*Primary Examiner*—Lincoln Donovan
*Assistant Examiner*—Brian S. Webb
*Attorney, Agent, or Firm*—Wei Te Chung

[57] ABSTRACT

A contact retention mechanism for a smart card connector comprises a frame (12) and a number of contacts (3). The frame (12) forms a guiding recess (124) and a number of contact slots (125). A positioning slot (1250) is formed in each contact slot (125) and comprises a straight slot (1254) and a transverse positioning recess (1255). Each contact (3) is received in a corresponding contact slot (125) and comprises a contact body (30), a solder portion (31), a retention portion (33) and a contact portion (32). The solder portion (31) further comprises a pair of flanges (311) formed on opposite ends thereof for being received in the corresponding transverse positioning recess (1255) of the positioning slot (1250) thereby precisely maintaining the position and alignment of the contact (3).

3 Claims, 6 Drawing Sheets

SMART CARD CONNECTOR HAVING CONTACT RETENTION MEANS

BACKGROUND OF THE INVENTION

The present invention relates to a smart card connector, and more particularly, to a contact retention means for precisely retaining contacts in a smart card connector for facilitating assembly.

DESCRIPTION OF PRIOR ART

Smart cards are being increasingly popular in the computer industry. A smart card connector is thus required to be mounted on a printed circuit board (PCB) for transmitting signals therebetween. The contacts of the smart card connector are typically soldered to conductive traces on a PCB. The contacts are supported in slots defined in a housing of the connector and tail portions of the contacts are bent at right angles. Each contact terminates at solder portions which extend downward from the connector housing for being soldered in corresponding holes defined in a PCB. Maintaining the position and alignment of the projecting solder portions for facilitating insertion into the holes of the PCB is an important issue facing connector designers.

One common technique for maintaining the position of the contact solder portions is to form a connector housing having a plurality of slots for interferentially engaging U-shaped, resilient retention portions of contacts whereby the solder portions thereof rigidly extend downward from the housing. However, if a bent section of the solder portion is offset, the solder portions cannot be precisely inserted into the holes defined in a PCB thereby hindering assembly.

Thus, it is desirable to provide a smart card connector having an improved contact retention means which overcomes the disadvantages of the prior art.

SUMMARY OF THE INVENTION

Accordingly, an object of the present invention is to provide a smart card connector having a contact retention means which precisely retains and aligns solder portions of connector contacts for facilitating assembly.

To achieve the object set forth, a contact retention means for a smart card connector in accordance with the present invention comprises a frame and a number of contacts. The frame forms a guiding recess and a number of contact slots. A first positioning slot is formed in the contact slot and comprises a straight slot and a transverse positioning recess. Each contact is received in the corresponding contact slot and comprises a contact body, a solder portion, a retention portion and a contact portion. The solder portion further comprises a pair of flanges formed on each end thereof for being received in the corresponding transverse positioning recess of the first positioning slot thereby precisely maintaining the position and alignment of the contact.

Other objects, advantages and novel features of the invention will become more apparent from the following detailed description when taken in conjunction with the accompanying drawings.

DETAILED DESCRIPTION OF THE INVENTION

Figure 1:
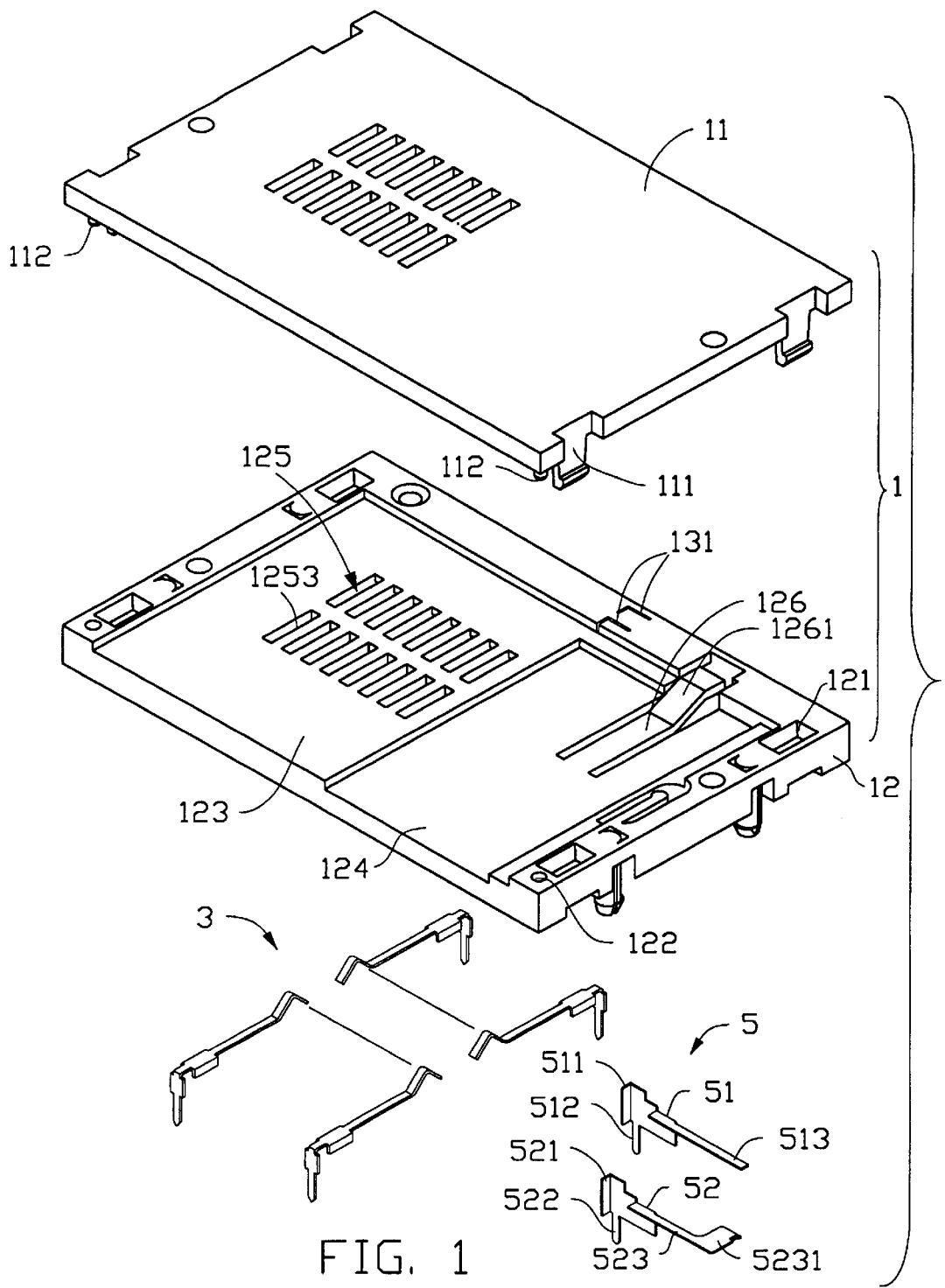
FIG. 1 is an exploded view of a smart card connector in accordance with the present invention.
Figure 4:
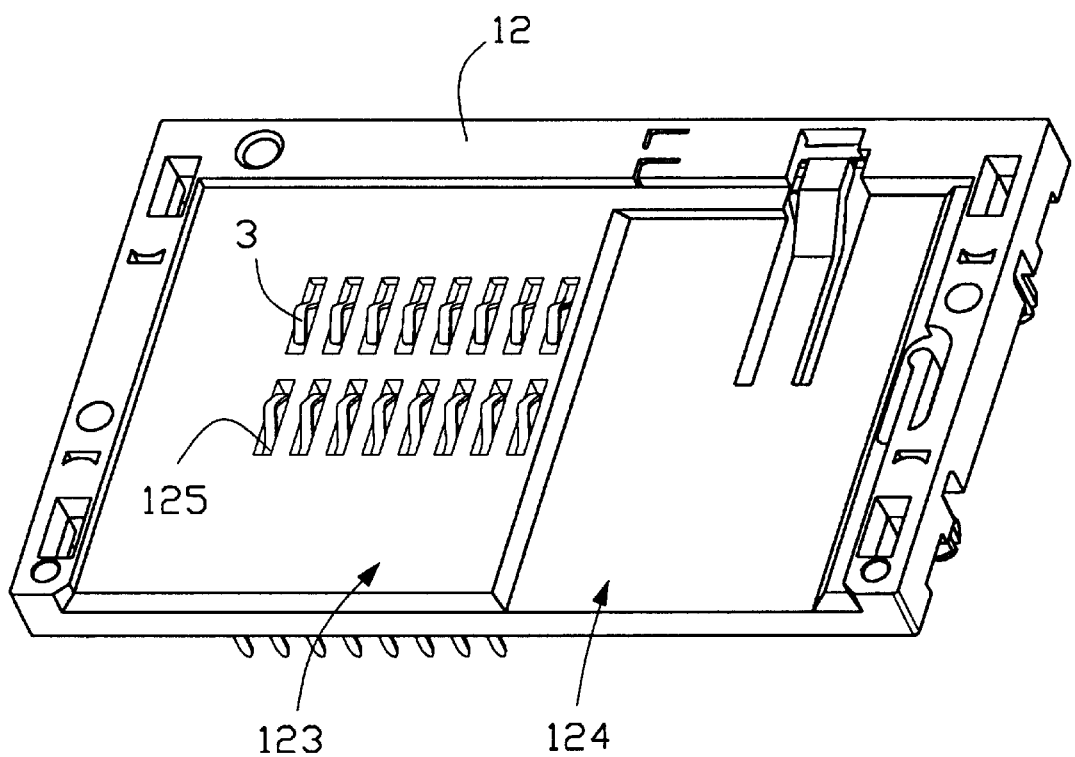
FIG. 4 is a top perspective view of FIG. 2.

Referring to FIGS. 1 and 4, a smart card connector comprises a housing 1, a plurality of contacts 3 and a switch device 5. The housing 1 includes a cover 11 and a frame 12. The cover 11 comprises a number of lockers 111 and rods 112, and the frame 12 comprises a number of channels 121 and holes 122 for engaging with the lockers 111 and rods 112 of the cover 11, respectively. A guiding plate 123 and a guiding recess 124 for guiding a smart card (not shown) are formed on the frame 12. A plurality of contact slots 125 is disposed in the guiding plate 123 for receiving the contacts 3 therein.

Figure 2:
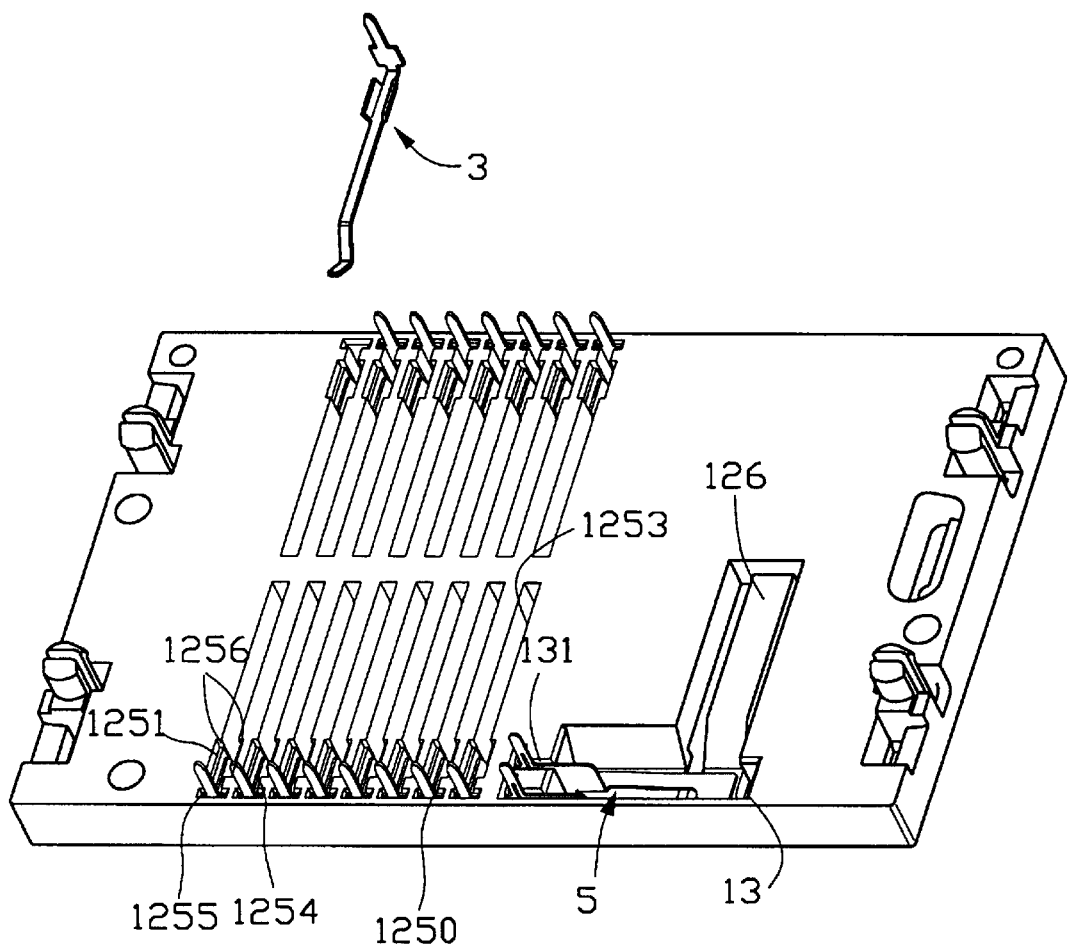
FIG. 2 is a bottom perspective view of a frame of the smart card connector with a plurality of contacts and a switch device received therein.
Figure 3:
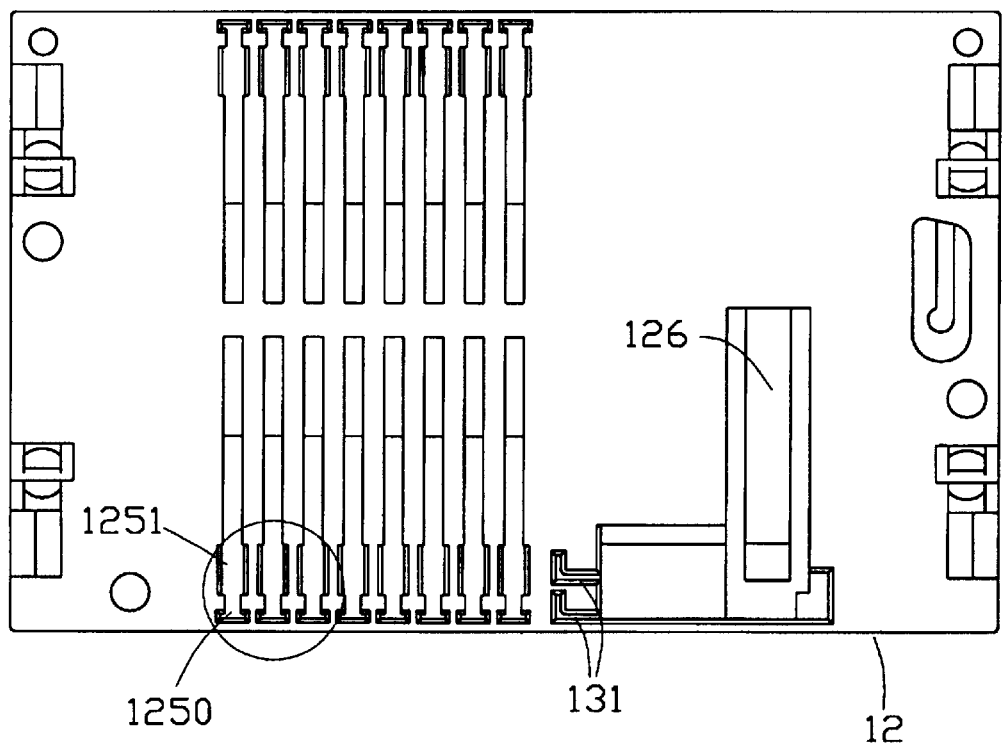
FIG. 3 is a plan view of a frame of the smart card connector.
Figure 3A:
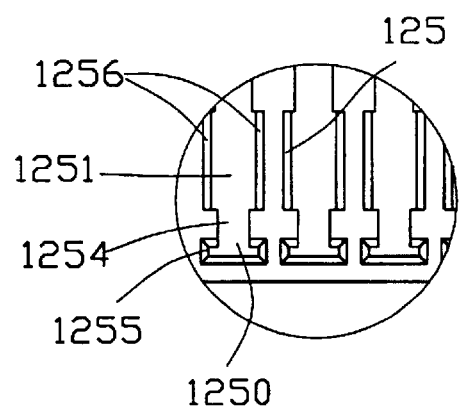
FIG. 3A is a partial, enlarged view of FIG. 3 showing first and second positioning slots of contact slots.

Referring to FIGS. 2, 3 and 3A, the contact slot 125 comprises a first positioning slot 1250, a second positioning slot 1251 and a through slot 1253. The first positioning slot 1250 is T-shaped and comprises a straight slot 1254 and a transverse positioning recess 1255. The second positioning slot 1251 comprises two side recesses 1256.

Figure 6:
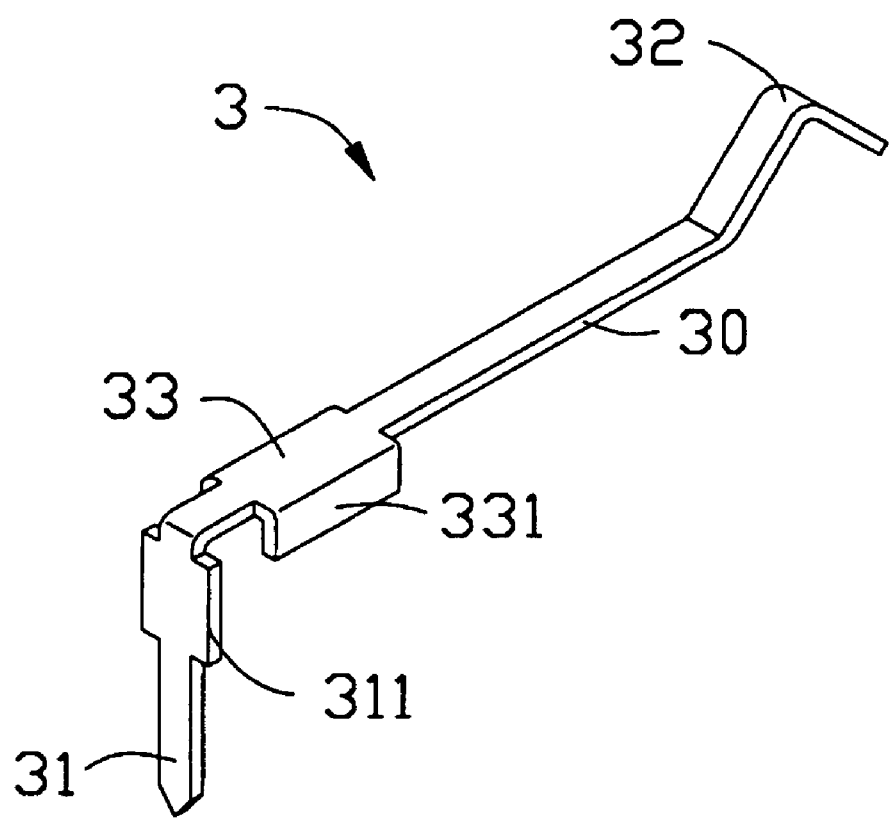
FIG. 6 is a perspective view of a contact of the present invention.

Also referring to FIG. 6, each contact 3 comprises a contact body 30, a solder portion 31, a contact portion 32, and a retention portion 33. The solder portion 31 is bent at a right angle relative to the contact body 30 with a pair of flanges 311 formed on opposite sides thereof. The two flanges 311 are received in the transverse positioning recess 1255 of the first positioning slot 1250 to precisely retain the position and alignment of the projecting solder portion 31 for facilitating insertion into holes defined in a PCB (not shown). The contact portion 32 is received in the through slot 1253 of the contact slot 125 and extends beyond a top surface of the frame 12 (FIG. 4) for connecting with corresponding conductive pads of a smart card. The U-shaped retention portion 33 comprises a pair of tabs 331 downwardly extending from opposite sides thereof for being received in the side recesses 1256 of the second positioning slot 1251.

Referring back to FIGS. 1 and 2, a spring arm 126 is disposed in the guiding recess 124 with and forms an inclined surface 1261 at a free end thereof. A switch channel 13 for receiving the switch device 5 is disposed in a bottom surface of the frame 12 with a positioning hole 131 disposed therein for interferentially receiving the switch device 5. The switch device 5 comprises a metal fixed blade 51 and a spring blade 52 each forming an engaging portion 511, 521 and a solder rod 512, 522 extending from an end thereof, wherein the spring blade 52 is actuatable to contact the fixed blade 51. The ends of the fixed blade 51 and the spring blade 52 are received in the positional hole 131 and the engaging portions 511, 521 are interferentially fit therein. The solder rods 512, 522 extend beyond the bottom surface of the frame 12 for soldering to a PCB. In addition, the fixed blade 51 further comprises a fixed contact blade 513 on an opposite end thereof abutting against a bottom surface of the frame 12. The spring blade 52 comprises a spring contact blade 523 having an L-shaped portion 5231 abutting against the fixed contact blade 513 in a direction away from the spring arm 126.

Figure 5:
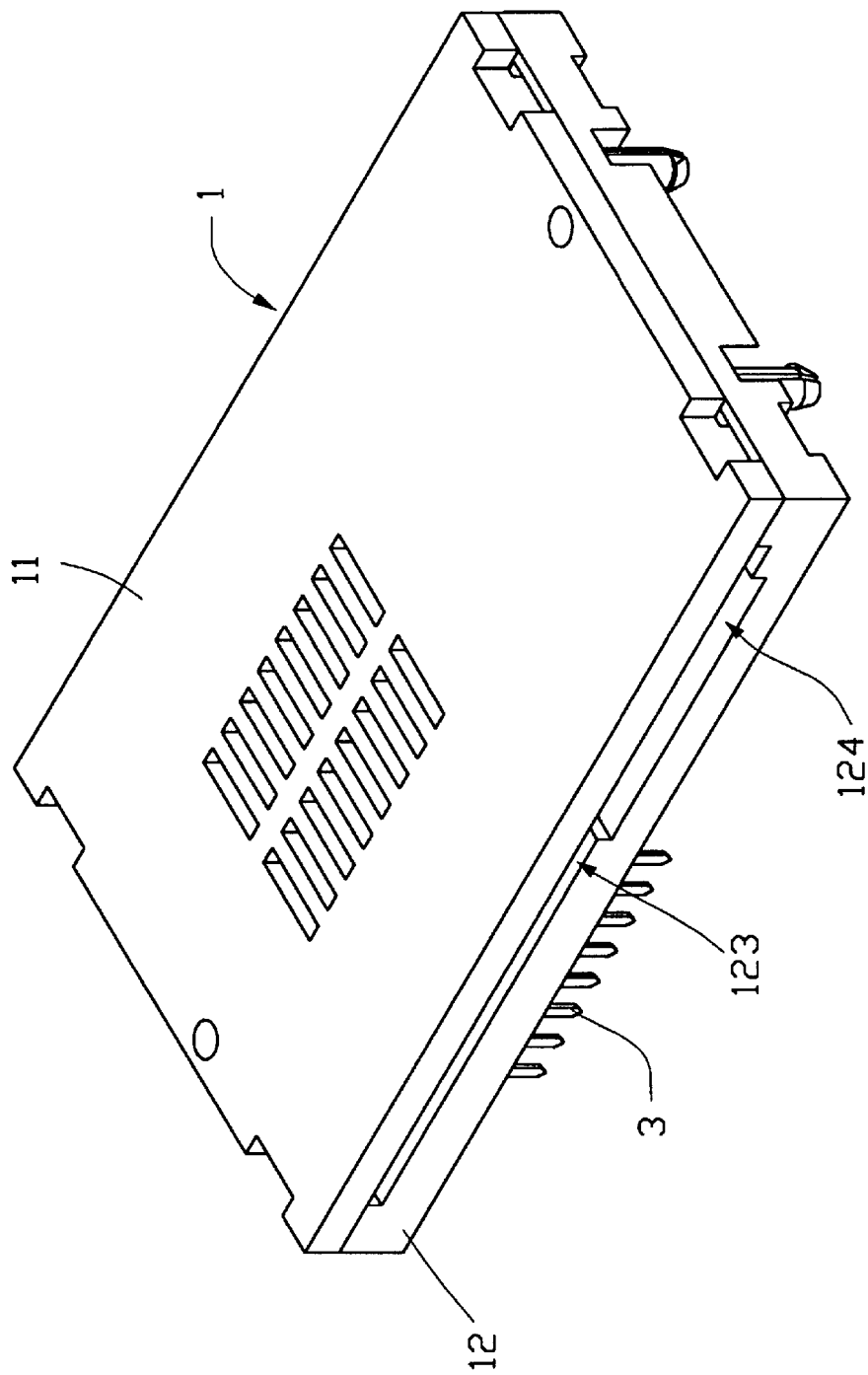
FIG. 5 is an assembled view of FIG. 1.

Also referring to FIG. 5, in assembly, the contacts 3 are received in the contact slots 125 of the frame 12 with the solder portions 31 downwardly extending therefrom for inserting in the holes of a PCB. The switch device 5 is interferentially received in the switch channel 13 disposed in the bottom surface of the frame 12 with the solder rods 512, 522 extending therebeyond for soldering to a PCB. Finally, attach the cover 11 to the frame 12 by engaging the lockers 111 and the rods 112 of the cover 11 with the channels 121 and the holes 122 of the frame 12, respectively.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A smart card connector comprising:

a housing including a cover and a frame secured to each other, the frame having an upper surface proximate the cover and a lower surface opposite the upper surface, the frame forming a plurality of contact slots each having a T-shaped first positioning slot and a second positioning slot, both first and second positioning slots being defined in the lower surface, the first positioning slot defining a transverse positioning recess and the second positioning slot defining a pair of side recesses; and a plurality of contacts received within the contact slots respectively, each of said contacts including a contact portion, a retention portion defining a pair of tabs, and a solder portion defining a pair of flanges, said tabs and said flanges respectively received within the corresponding side recesses and positioning recess and being exposed to the lower surface of the frame.

2. The smart card connector as described in claim 1, wherein said first positioning slot comprises a straight slot communicating between the transverse positioning recess and the second positioning slot.

3. The smart card connector as described in claim 1, wherein each of said contact slots comprises a through slot in communication with the first and second positioning slots for extension of the contact portion of the corresponding contact therethrough and above the upper surface of the frame.

* * * * *